United States Patent [19]
Alesi, Jr. et al.

[11] Patent Number: 5,401,456
[45] Date of Patent: Mar. 28, 1995

[54] METHOD OF FORMING A PLASTIC UNIT HAVING AN OUTER PLASTIC SHELL ENCAPSULATING A FOAM CORE

[75] Inventors: John Alesi, Jr., Fulton County; Robert L. Browning, DeKalb County, both of Ga.

[73] Assignee: Formex Manufacturing, Inc., Lawrenceville, Ga.

[21] Appl. No.: 938,484

[22] Filed: Aug. 31, 1992

Related U.S. Application Data

[63] Continuation of Ser. No. 582,129, Sep. 12, 1990, abandoned, which is a continuation of Ser. No. 319,832, Mar. 3, 1989, abandoned, which is a continuation of Ser. No. 106,101, Oct. 7, 1987, abandoned.

[51] Int. Cl.$^6$ .............................. B29C 51/10
[52] U.S. Cl. .................. 264/511; 264/553; 264/161; 264/251; 264/321; 156/245
[58] Field of Search ............. 156/245; 264/45.1, 46.8, 264/251, 510, 511, 553, 321, 161

[56] References Cited

U.S. PATENT DOCUMENTS

| | | | |
|---|---|---|---|
| 984,007 | 7/1979 | Richardson | 264/45.1 |
| 2,976,577 | 3/1961 | Gould | 264/46.8 |
| 2,991,965 | 7/1961 | Drieborg . | |
| 3,073,274 | 1/1963 | Lamb . | |
| 3,159,115 | 12/1964 | Nolan . | |
| 3,192,099 | 6/1965 | Beckman et al. . | |
| 3,242,245 | 3/1966 | Greig . | |
| 3,250,660 | 5/1966 | Greig . | |
| 3,289,621 | 12/1966 | Sebring . | |
| 3,323,151 | 6/1967 | Lerman . | |
| 3,330,228 | 7/1967 | Donnelly . | |
| 3,412,183 | 11/1968 | Anderson . | |
| 3,511,191 | 5/1970 | Barry, Jr. et al. . | |
| 3,521,588 | 7/1970 | Atlas . | |
| 3,581,681 | 6/1971 | Newton . | |
| 3,630,157 | 12/1971 | Ortenblad . | |
| 3,699,902 | 10/1972 | Allgeyer et al. . | |
| 3,702,100 | 11/1972 | Wharton . | |
| 3,707,929 | 1/1973 | Lauffer . | |
| 3,719,157 | 3/1973 | Arcocha et al. . | |
| 3,752,102 | 8/1973 | Shuman . | |
| 3,757,704 | 9/1973 | Allgeyer et al. . | |
| 3,760,754 | 9/1973 | Drummond et al. . | |
| 3,785,312 | 1/1974 | Schneider . | |
| 3,828,965 | 8/1974 | Yarbrough . | |
| 3,832,955 | 9/1974 | Pottinger et al. . | |

(List continued on next page.)

FOREIGN PATENT DOCUMENTS

| | | | |
|---|---|---|---|
| 8304536 | 4/1983 | France . | |
| 3038795 | 5/1982 | Germany | 264/46.4 |
| 3146381 | 6/1983 | Germany | 264/46.8 |

OTHER PUBLICATIONS

Modern Plastics Encyclopeida at pp. 242–243 (1986–1987).
"Expandable Polystyrene for Molded Foam," *Plastic Engineering Handbook* at pp. 534–546 (fourth edition).
Promotional literature for the Follansbee Float Drum.
Promotional literature for the Dayton Float Drum.
Promotional literature for the Dura–Float.
Promotional literature for the Follansbee Dock System.
Marina Dock Systems, "Boat & Motor Dealer" (Jul. 1986).
Promotional literature for the Follansbee Mod-U-Float.
Promotional literature for the Poly Float.

*Primary Examiner*—Allan R. Kuhns
*Attorney, Agent, or Firm*—Kilpatrick & Cody

[57] ABSTRACT

A top sheet and a bottom sheet are thermoformed about a foam core which has feet making spaces for the tines of a fork lift truck. The top and bottom sheets meet at a line on the pallet edge to fuse and bond together and may be applied simultaneously to the core while the core is confined in a mold cavity.

2 Claims, 5 Drawing Sheets

U.S. PATENT DOCUMENTS

| | | | |
|---|---|---|---|
| 3,873,654 | 3/1975 | Smith | 156/245 |
| 3,879,245 | 4/1975 | Fetherston et al. | 156/245 |
| 3,910,474 | 10/1975 | Dean . | |
| 3,914,101 | 10/1975 | Stefanka . | |
| 3,914,103 | 10/1975 | Dean . | |
| 3,914,104 | 10/1975 | Dean . | |
| 3,970,024 | 7/1976 | Fisher . | |
| 4,023,755 | 5/1977 | Alesi . | |
| 4,039,643 | 8/1977 | Dean et al. | 264/553 |
| 4,094,110 | 6/1978 | Dickens et al. . | |
| 4,142,471 | 3/1979 | Mustoe et al. . | |
| 4,240,557 | 12/1980 | Dickens . | |
| 4,241,555 | 12/1980 | Dickens et al. . | |
| 4,256,797 | 3/1981 | Stamper et al. | 264/321 |
| 4,284,447 | 8/1981 | Dickens et al. . | |
| 4,350,730 | 9/1982 | Cyr et al. | 428/215 |
| 4,418,634 | 12/1983 | Gerbus . | |
| 4,428,306 | 1/1984 | Dresen et al. . | |
| 4,548,775 | 10/1985 | Hayashi et al. . | |
| 4,592,583 | 6/1986 | Dresen et al. . | |
| 4,655,156 | 4/1987 | Svirklys . | |
| 4,709,647 | 12/1987 | Rytand . | |
| 4,867,093 | 9/1989 | Sullivan . | |

METHOD OF FORMING A PLASTIC UNIT HAVING AN OUTER PLASTIC SHELL ENCAPSULATING A FOAM CORE

This is a continuation of application Ser. No. 07/582,129, filed on Sep. 12, 1990, now abandoned, which is a continuation of prior application Ser. No. 07/319,832, filed on Mar. 3, 1989, now abandoned, which a continuation of prior application Ser. No. 07/106,101, filed Oct. 7, 1987, now abandoned.

Pallets are support units which comprise a generally flat platform and spaces in which the tines of a forklift truck may be inserted to move the pallet from one location to another. Pallets have other uses such as flotation devices. This invention relates to plastic pallets which may be manufactured from two sheets of copolymer material (polyethylene) with different guage thickness and a foam (expanded polystrene foam) core that yields a completely solid filled cavity between the copolymer sheets; means of thermoforming the sheets about a solid foam core having spaced, bottom portions which become pads or feet through which forklift tines are inserted.

Prior pallets have been constructed both from wood and/or metal and a combination thereof as well as plastic. For example, the plastic pallets disclosed in U.S. Pat. Nos. 3,511,191 and 3,581,681 are not made from twin sheets encapsulating a foam core. The pallet in U.S. Pat. No. 3,511,191 is molded from thermoplastic foam particles, such as polystyrene, and the pallet in U.S. Pat. No. 3,581,681 is constructed of a thin-walled, resinous shell filled with a foam core which may be provided with a top sheet after the shell is filled.

A procedure for vacuum forming sheets of material around solid foam, wood and metal is known previously for such items as a transformer mounting pad of the sort disclosed in U.S. Pat. No. 4,023,755. An apparatus and procedure for thermoforming is also known and disclosed, for example, in U.S. Pat. Nos. 3,914,103; 3,914,104 and 3,910,747.

One extremely important and basic problem with the prior plastic pallets is the lack of structural integrity and sufficient strength to withstand the various forces to which the pallet is subjected during use. Indeed, for this reason, the transformer mounting pads, such as those disclosed in U.S. Pat. No. 4,023,755, are provided with a wood and foam core enclosed within a plastic shell and structural rigidity is provided by lateral transverse cross braces connected to form a wooden frame work, whereas the present pallet is formed with a solid foam core encapsulated within bottom and top sheets. Transformer pads are not moved after installation.

Shipping pallets must be moved and used in different ways and subjected to many different forces, some of which are very abrupt, whereas transformer pads are made to be located in place to support an electrical transformer and not to be moved around once the transformer has been placed on the pad. The advantages of the present pallet include the following:

1. Variation in material thickness permitting the variation in static and dynamic load capabilities.
2. Different internal foam densities, whereas other pallets cannot be filled with foam or uses a urethene foam which will provide only approximately an 80 percent fill leaving voids and air pockets where moisture can collect and become structural weakness.
3. The capability of adding additional internal structure, such as wood, metal, fiber, etc., or combinations thereof, to create an even stronger pallet while still being lightweight. On the other hand, the pallet may be filled with a solid foam core which was in solid state molded in form of the pallet at the time it was encapsulated and bonds to the outer shell between the sheets so as to fill the void and become structurally integral with the outside sheets for maximum strength and rigidity. An advantage of the arrangement is that the pallet acts like a cushion for vibrations and any damaging movement which arises during use with a load.

Also, the present pallet may be vacuum formed from a top and bottom sheet applied to a pre-fabricated foam core that has bottom portions which become spaced feet and the core and bottom sheet are forced into a mold simultaneous with the additions of the top sheet thereby providing an integral structure.

A main object of the pallet is the light weight in comparison to wooden pallets and the structural integrity derived from the completely filled foam core that is void of air pockets and areas which would be structurally weak or where moisture could collect. Furthermore, the pallet has flexibility in both the manufacturing process and as an end product for the user. With the correct combination of materials (different material thickness and foam densities) the pallet would be able to support a large mass of weight—both static and dynamic. According to the present invention, pallets can be made in at least three separate configurations;

1. A single-sided pallet that is completely flat on one side and opposite side (bottom side) has pods or feet with recesses in between the pods to allow for lifting system (forklift truck tines) to be inserted, either for 2way or 4way entry.
2. A low-profile single-sided which is, for example, only 2 and ½ inches tall rather than 5 inches tall in the case of a standard single-sided pallet.
3. A double-sided pallet which is two of the low-profiles single-sided pallets, fastened together (either mechanically, thermally, chemically, synthetically) so that the top and bottom of the pallet is completely flat, while in between the top and bottom there are openings for a lift entry system.

BRIEF DESCRIPTION OF THE DRAWINGS

Other and further objects and advantages of this invention will become apparent upon reading the following description of a preferred embodiment of the pallet, preceded by a review of the method and procedure for vacuum forming the pallet, utilizing basically existing vacuum forming equipment, taken in conjunction with the accompanying drawings, in which.

DESCRIPTION OF THE PREFERRED EMBODIMENTS

Figure 1:
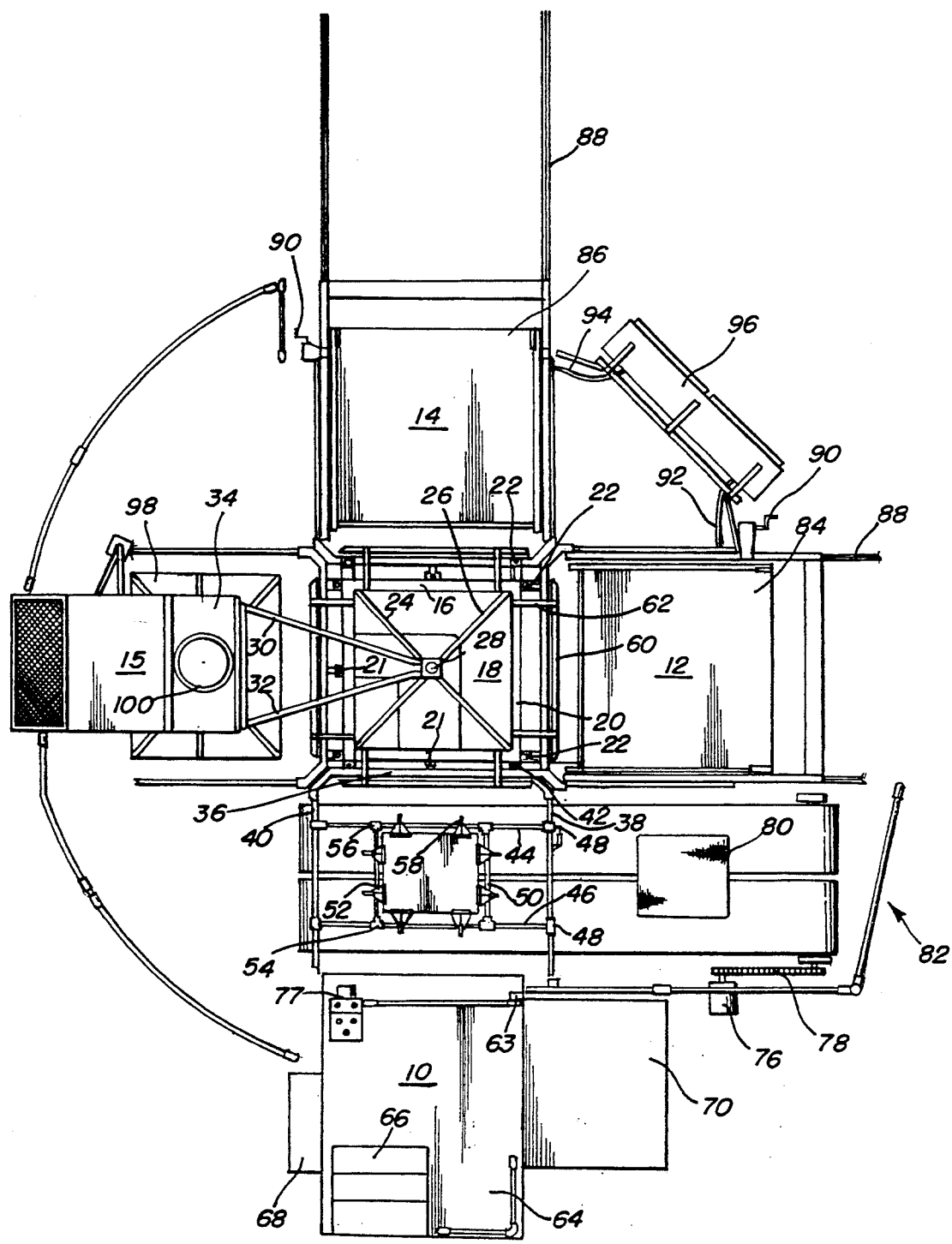
FIG. 1 is a copy essentially of the plan view in FIG. 1 of U.S. Pat. No. 3,910,747 using the same reference numbers in the specifications of that patent to describe the molding apparatus which can be used to make the pallet of the present invention.

With reference to FIG. 1, which is the same as FIG. 1 of U.S. Pat. Nos. 3,914,103 and 3,910,747, and utilizes the same reference numbers, the molding apparatus comprises a loading-unloading station 10, heating station 12 and 14 and a molding station 15. Disposed about a central transport mechanism in the form of a rotary carousel which has a central frame 16 mounting upon a turn-table 18. The central core of the carousel is formed by upper and lower, generally square, horizontal frames 20 which bear two upright channel members 22 on each corner thereof and a central, upright channel 21. The horizontal frames are internally braced by cross-members 24 and 26. The upper cross members support a central shaft 28 that is mounted in a bearing carried by frame arms 30 and 32 which are attached to a stationary structure such as the upper front face of press 34 that is positioned in the molding station 15.

The upright channels 21 and 22 form vertically disposed track means in which are mounted the carriages that support the open frameworks which support and carry the thermoplastic sheets. A typical carriage assembly is illustrated in the loading-unloading station 10. This carriage assembly can be seen to be formed of a major cross arm 36 to which are secured two, radially dependent, main frame arms 38 and 40. The crossarm 36 supports the carriage by a vertical flange 42. A plurality of such carriage assemblies are employed in vertically spaced apart positions on each side of the foursided carousel frame 16.

The main frame side arms 38 and 40 support longitudinal frame members 44 and 46 which are attached to the main frame arms 38 and 40 by suitable bracket means 48 which are slideably mounted on the frame arms and which bear clamping means for the fixed adjustability of the position of the longitudinal members on the frame arms. The longitudinal frame members, in turn, support a pair of cross arms 50 and 52 which are mounted thereon by brackets 54 and 56 which are slideably engaged with the longitudinal frame members and which bear lock means whereby the positions of the crossarms 50 and 52 in the assembly can be fixedly adjusted.

The longitudinal members 44 and 46 and the crossarms 50 and 52 bear modular clamp assemblies 58 at a plurality of positions thereon and these clamp assemblies are effective in securing the peripheral edges of thermoplastic sheets which are placed in the open frameworks and carried thereon during the transfer and transport operations of the apparatus.

The carousel frame 16 is covered with a plurality of side panels 60 that are secured thereto by brackets such as 62 which extend from the upper edges of the upright panels 60 to the supporting main frame members 20.

The loading-unloading station of the apparatus comprises a horizontal platform 64 which has a control console 66 housing the operative controls for the apparatus. The platform is raised above the floor elevation and suitable steps 68 can be provided for access to the platform. Adjacent to the platform is a stack of thermoplastic sheets 70 from which the operator can withdraw the sheets for loading in the open framework assembly.

Directly beneath the open frameworks at the loading-unloading station is suitable conveyor means such as conveyor belts 72 and 74 which are driven by conveyor motor means 76 that is coupled by belt 78 to the common drive shaft of the conveyor belts. Molded products which are ejected from the open frameworks in the manner hereinafter described, fall onto conveyor belts 72 and 74 and are transported therefrom, as shown for molded product 80, to a suitable handling station 82.

The molding apparatus has heating stations 12 and 14 which are provided with heater assemblies 84 and 86 which are moveably mounted by suitable carriage means on tracks 88 in the manner hereinafter described. The heaters have plurality of vertically spaced apart heating elements and the vertical positions of these heating elements can be fixedly adjusted by the crank means 90 shown to one side of each of the heating assemblies. The energy for the heating elements can be furnished by any suitable means; a preferred and convenient source is electrical power which is supplied to the heating assemblies by flexible electrical conduits 92 and 94 which extend from the electrical connector and fuse panel cabinet 96 to the heater assemblies 84 and 86.

A hydraulic press 34 is located in the molding station. Press 34 has a moveable upper platen 98 carried by the hydraulic ram that is reciprocal within the power hydraulic cylinder 100 at the top of the hydraulic press. Press 34 may be operated by other than hydraulics (e.g. electrical and mechanical).

The foregoing description and numbers are taken from FIG. 1 of U.S. Pat. No 3,914,103.

Figure 2:
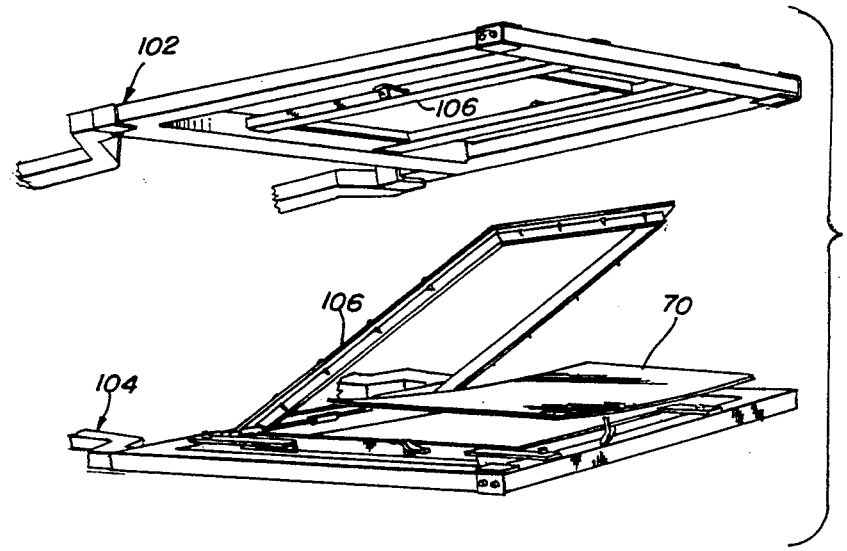
FIG. 2 is a perspective view showing the two frames holding the plastic sheets, similar to what is used in U.S. Pat. No. 3,910,747.
Figure 3:
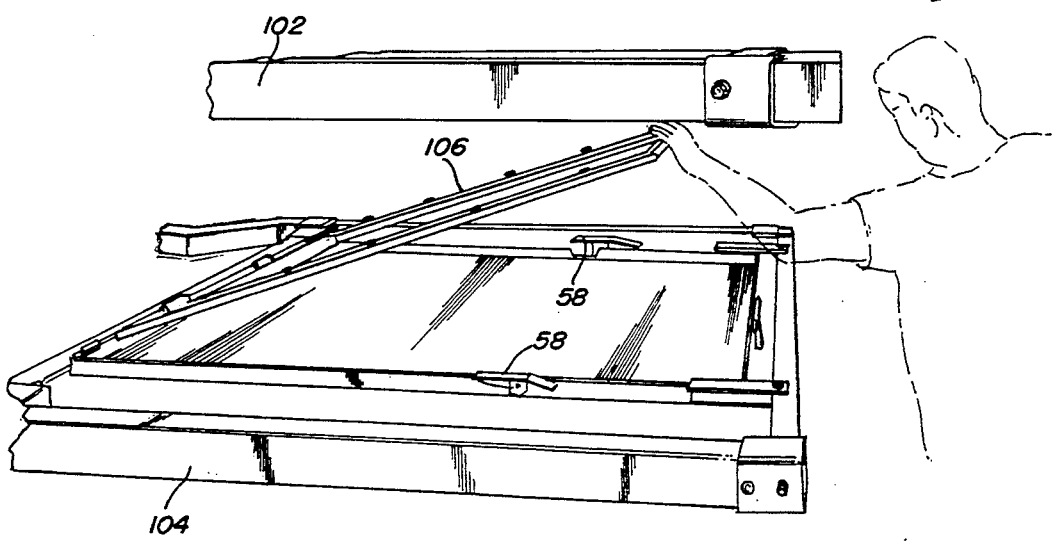
FIG. 3 is a perspective view showing a plastic sheet installed in the bottom frame and a clamping frame ready to be lowered.
Figure 4:
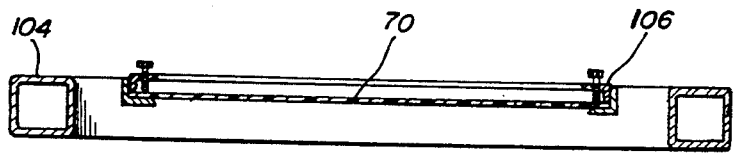
FIG. 4 is a cross-sectional view through one of the frames in FIG. 2 and 3 and showing said screws which hold the sheet.
Figure 5:
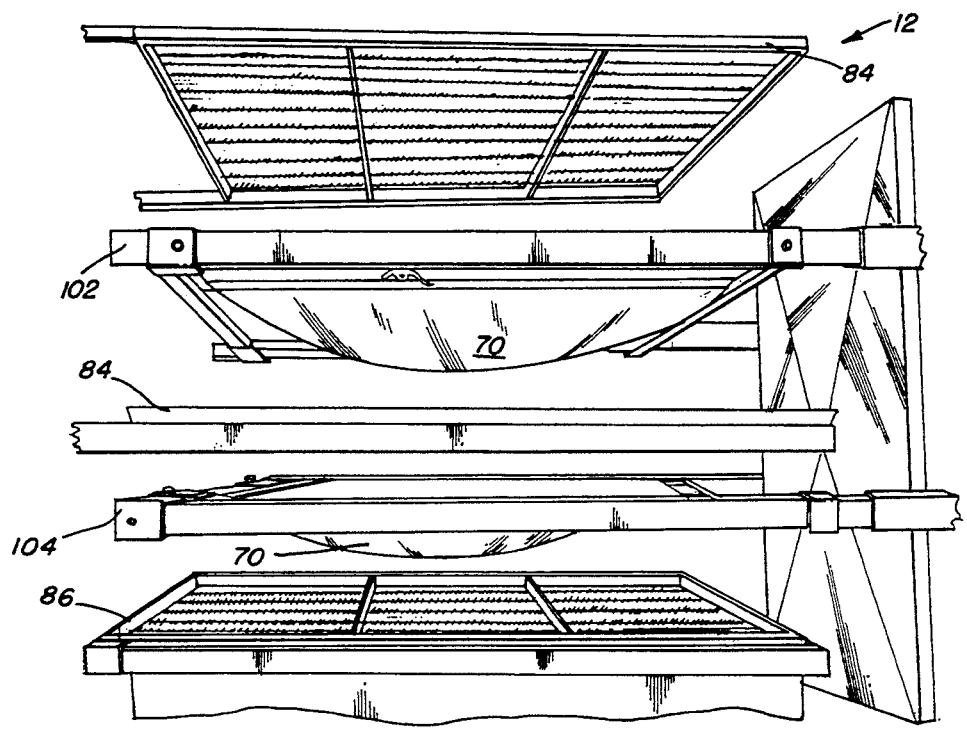
FIG. 5 is a perspective view of one of the frames of FIGS. 2 and 3 being inserted between three banks of heating elements which caused the plastic sheet to become pliable and to drape under its own weight.
Figure 6:
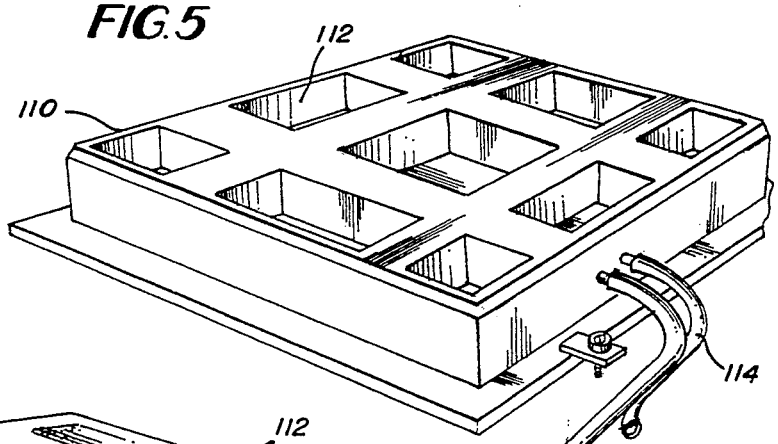
FIG. 6 is a perspective view of the bottom mold which forms the bottom of the pallet, showing water lines for cooling.
Figure 7:
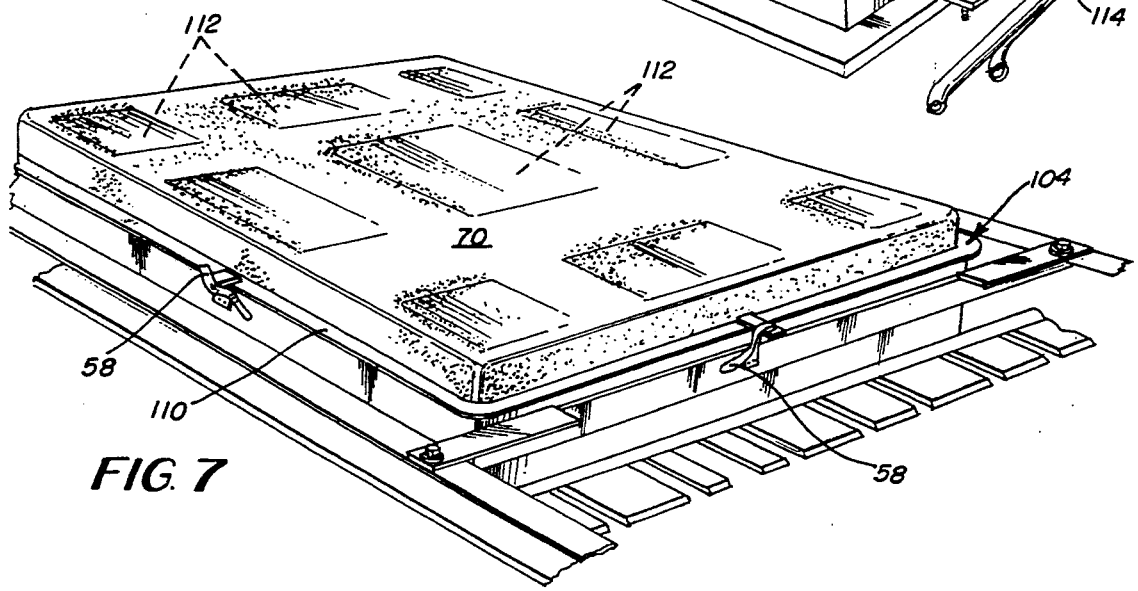
FIG. 7 is a perspective view of the mold in FIG. 6 showing a plastic sheet clamped in place and the effects of the vacuum in the cavities.

Referring now to FIG. 2, substantially identical to top sheet frame assembly 102 and bottom sheet frame assembly 104 each comprises a movable frame 106 and a respective fixed frame 108 in which a respective top sheet 70 or bottom sheet 70 are removably clamped by means of the clamping devices 58 to hold respective sheets 70 in place, as shown in FIG. 4. Platen 98 holds top mold 109. The respective sheet frame assemblies, with the respective sheets 70 in place in the respective frames 106, are moved into position beneath heating elements 84, 86 in the manner shown in FIG. 5 and the sheets 70 are heated until each sheet is flexible and drapes or sags under its own weight. Then, as shown in FIG. 6, the bottom frame 104 is moved into position over a bottom mold 110 in which there are mold cavities in a particular arrangement. Mold 110 is cooled by means of hoses 114 through which is circulated a cooling fluid. Next, as seen in FIG. 7, the bottom sheet frame assembly 104 is moved into position over the bottom mold 110 and the bottom sheets 70 is draped over the top of mold 110 so that portions of bottom sheet 70 cover the cavities 112.

Figure 8:
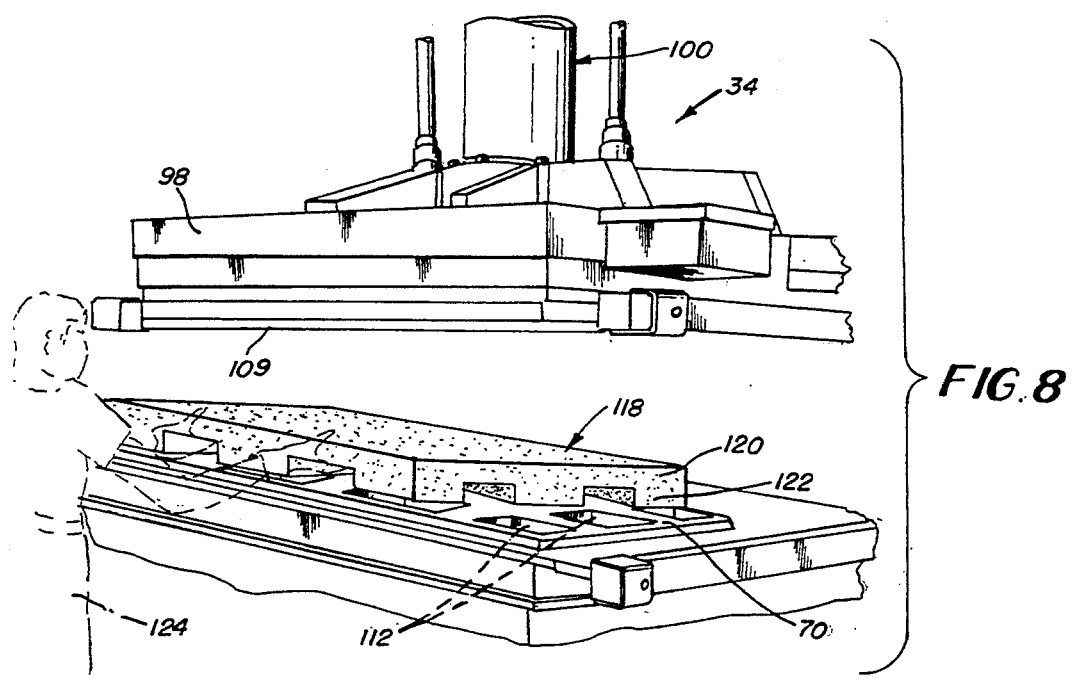
FIG. 8 is a perspective view of the mold in FIG. 7 with the top platen open and the bottom mold having the plastic sheet into the cavities as an operator prepares to lower the foam core into place.
Figure 9:
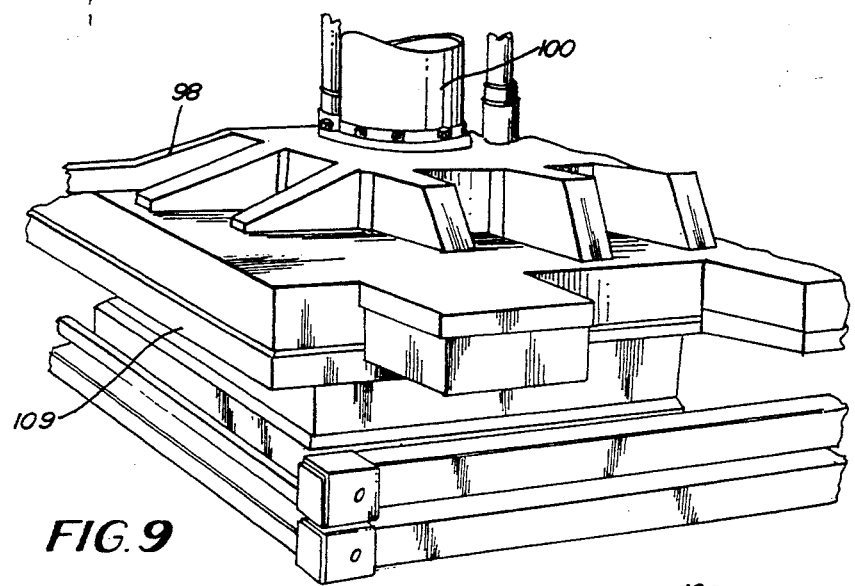
FIG. 9 is a perspective view of the mold completely closed so that the top and bottom plastic sheets are being fused to the plastic core and each other.

Referring to FIG. 8, a pre-fabricated core 118 is constructed (e.g. molded) from solid styrofoam (EPS or expanded polystyrene) in a shape corresponding almost identical to but smaller than the mold 110 shown in FIGS. 6 and 8. The core 118 has a substantially flat, thick quadrilateral top 120 to which is attached on the bottom thereof an arrangement of protruding sections 122 corresponding to the cavities 112.

Procedures for molding foam are disclosed in U.S. Pat. Nos. 4,094,110; 4,241,555 and 4,284,447 and in an article in MODERN PLASTICS ENCYCLOPEDIA 196-86 by J. E. Shannon, beginning at page 242. Also, there is an article in PLASTIC ENGINEERING HANDBOOK, page 534, entitled "Expandable Polystyrene for Molded Foam". It is possible to contract fabrication of foam core 118 manufactured to specifications by a commercial company experienced in such fabrication.

Core 118 is dimensioned to be slightly smaller than the mold 110 and cavities 112, so that it is forced tightly while wrapped with bottom sheet 70 into the mold by means of the platen 98 which is operated by pressure from the hydraulic cylinder 100. Sheet frame top assembly 102 is mounted beneath the platen 98 and as mentioned previously, bottom sheet 70 has been draped over the top of mold 110 and vacuum applied before the core 118 is inserted so that after the operator 124 in FIG. 8 positions the core 118 into place, the platen 98 is lowered, with mold 109 and sheet 70 compressing the core 118 with sheet 70 into place in the cavities 112 which are covered by bottom sheet 70, pulled tightly against the mold, whereupon, in the manner described in U.S. Pat. Nos. 3,914,103 and 3,914,104, top sheet 70 and bottom 70 are drawn tightly around the core 118 producing a pallet 126 shown in FIG. 10 being trimmed by an operator 124 removing surplus fused edges 125 of sheet 70 by means of a knife 128 along a trim line pinch-off edge 129.

Figure 10:
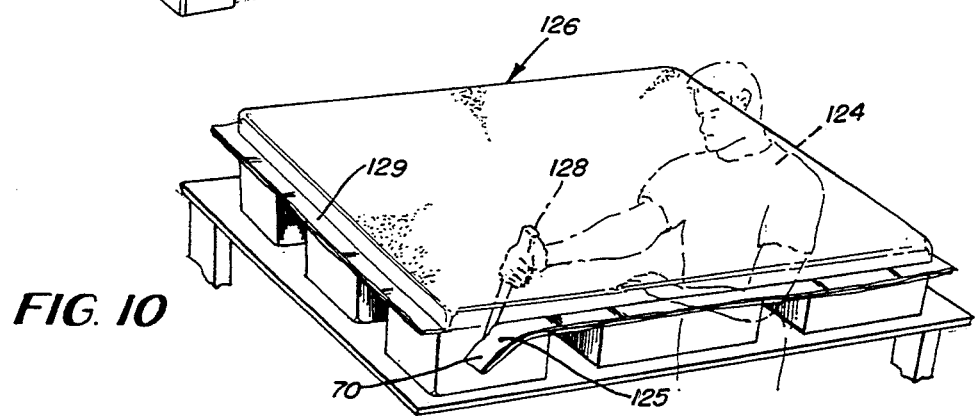
FIG. 10 is a view of one of the completed pallets after removal from the molds and showing the start of a trimming process to remove the excess sheeting material.
Figure 11:
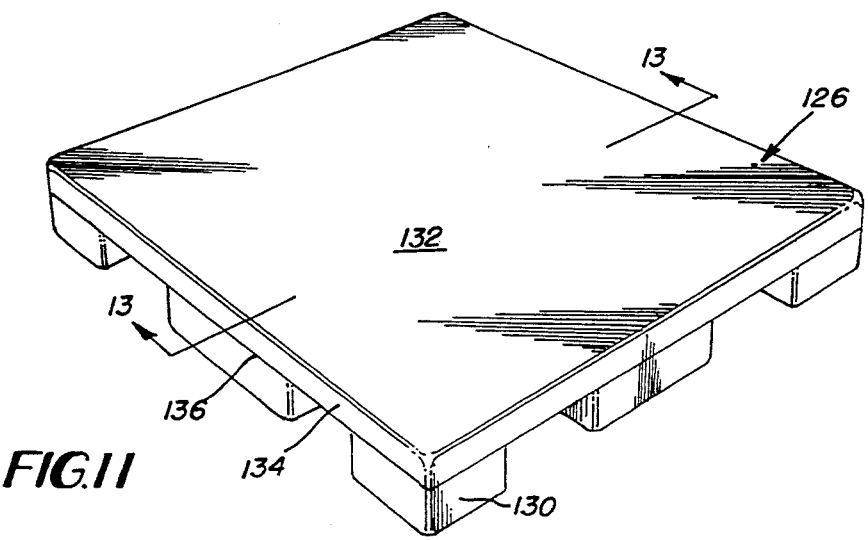
FIG. 11 is a perspective view of one of the pallets after being trimmed.
Figure 12:
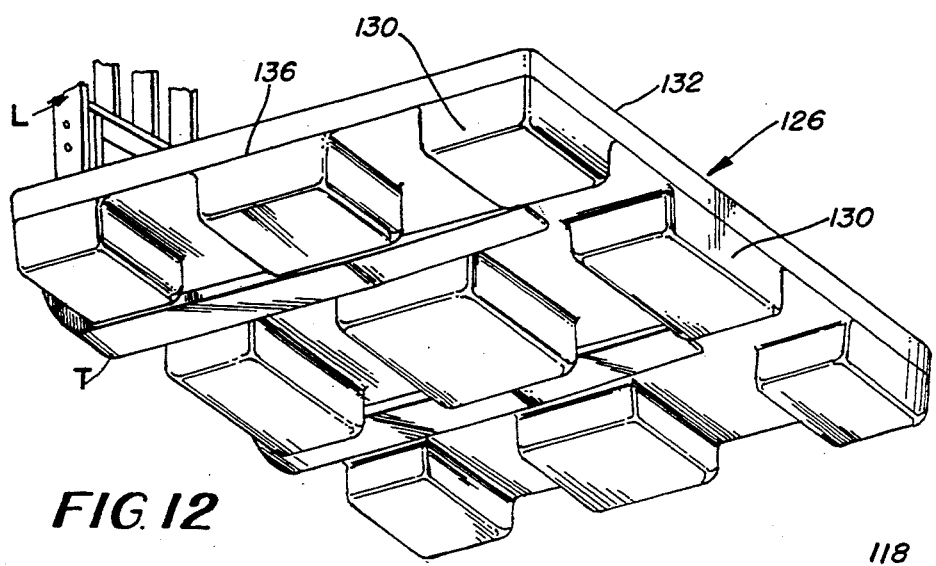
FIG. 12 is a bottom perspective view of the pallet in FIG. 11 showing the legs or pods designed for lifting with the fork lift tines in place.
Figure 13:
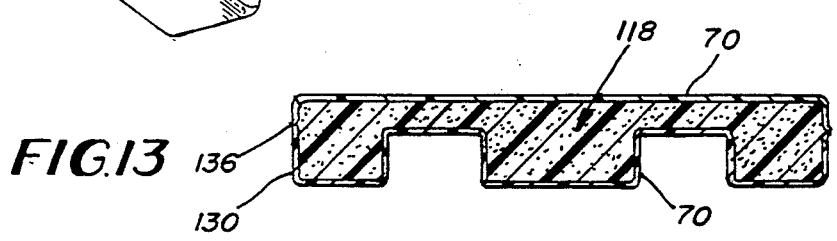
FIG. 13 is a cross-sectional view taken along the lines 13—13 of FIG. 11 and showing the solid inner core.

Referring to FIGS. 11-13, the plastic pallets 126 have been manufactured from two sheets 70 of polymer material (polyethelene) with different guage thicknesses (as selected, depending on the load and usage of and the pallet 126) of a formed expanded polystyrene foam core 118 that yields a completely solid filled cavity between the sheet 70. The core 118 sections 122 are encapsulated between the sheets 70 to become the feet or pods 130. The top 132 of pallet 126 is substantially flat and the sides 134 meet along fused edge 136 as shown in FIG. 10. The plastic sheets 70 have been fused together at the edges 136 and the foam core 118 has been bonded to the sheets 70. In FIG. 12 a pallet 126 has the tines T of a fork lift truck L inserted between the feet or pods 130.

Just before the top mold 109 is closed on the bottom mold 110 there is a brief pause for the hydraulics to kick into high-pressure so that the two molds 109 and 110 are actually compressing the two together to fuse the edges of the perimeter plastic sheets 70 together, tightly sealing and bonding the core 118 inside. The compressing of the two molds 109, 110 together also acts as an asset in the trimming of the parts. The molds have been designed so that they have a "pinch-off" edge all along the perimeter edges 129 which squeezes the plastic sheet 70 down to approximately, for example, 0.01 inch thick. This area along the perimeter acts as a guide for the final trimming shown in FIG. 10. Once the two molds 109, 110 are closed, they are left shut for a preset amount of time to allow the plastic sheets 70 to cool and thus hold the shape of the mold. If the mechanized operation shown in the prior U.S. Pat. Nos. 3,914,103; 3,914,104; and 3,910,747 are utilized then the carousel turn-table 18 rotates the plastic sheet frames 102, 104 back into loading/unloading position and at this point, the pallet 126 is formed, but is still very hot and still has sheets 70 portions 125 around the edges that has to be trimmed off. Once the top frame 102 has been released, the operator 124 opens the bottom frame 104 and pushes the pallet 126 out onto the conveyor 72, 74 directly below the sheet frames 102, 104. The conveyor 72 takes a part shown in FIG. 10 away from the machine into the trimming station.

Figure 14:
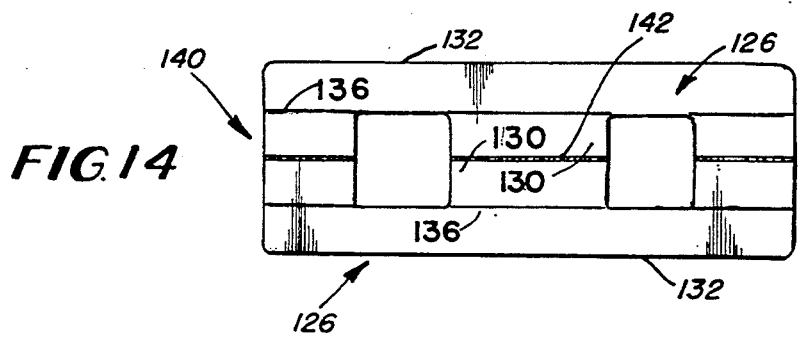
FIG. 14 is a side elevation view of a double pallet.

In FIG. 14 there is shown a double sided pallet 140 comprising two of the pallets 126 positioned against each other so that the feet 130 are abutted and joined by means of double-sided tape 142. In lieu of tape 142, bolts (not shown) are inserted through both assembled pallets 126 and the bolts may be reversed on the surface into sheets 70.

While we have shown and described a preferred embodiment of our invention for particular use as a pallet, various changes may be made in the preferred embodiment and there are other uses, such as flotation devices, of our invention and departures from the embodiment described without avoiding the scope of our invention defined by a proper interpretation of the following claims.

We claim:

1. A method for forming a plastic unit using a molding apparatus having a carousel mechanism, comprising the steps of:
   a. clamping a first sheet of substantially rigid polyethylene material having a first thickness between a first fixed frame and a first moveable frame of a first frame assembly mounted to the carousel mechanism, so that the central portion of the sheet is unsupported by the frame assembly;
   b. clamping a second sheet of substantially rigid polyethylene material having a second thickness unequal to the first thickness between a second fixed frame and a second moveable frame of a second frame assembly mounted to the carousel mechanism, so that the central portion of the sheet is unsupported by the frame assembly;
   rotating the carousel mechanism to position the first and second sheets and frame assemblies intermediate at least two heaters slidably mounted to the molding apparatus and having a plurality of adjustably-positioned heating elements;
   d. heating the first and second sheets until the unsupported section of each sheet is flexible and sagging under force of gravity;
   e. rotating the carousel assembly to position the first frame assembly containing the first sheet over a first fluid-cooled mold section having a length, width, and a matrix of cavities defining mold protrusions designed to create voids in the formed plastic unit capable of receiving the tines of a forklift;

f. lowering the first frame assembly containing the first sheet onto the first mold section so that the unsupported portion of the first sheet covers the cavities; positioning onto the first sheet a prefabricated solid foam core having a substantially flat top, a bottom comprising a matrix of protrusions substantially corresponding to and complementing the cavities of the first mold section, and a length and width slightly less than the respective length and width of the first mold section and aligning the core protrusions with the mold section cavities;

h. mounting the second frame assembly containing the second sheet to the underside of a hydraulically-operated, moveable platen comprising a second mold section and positioning the platen over the first mold section;

i. evacuating the first mold section so that the shape of the first sheet substantially conforms to the first mold section;

j. lowering the platen onto the first mold section and compressing the core between the first and second sheets, thereby fusing the edges of the first and second sheets and encapsulating the core within the sheets to thermoform a plastic unit;

k. permitting the plastic unit to cool;

l. unclamping from the second frame assembly the second sheet forming a part of the plastic unit and raising the platen;

m. unclamping from the first frame assembly the first sheet forming a part of the plastic unit; and n. trimming a portion of the fused edges of the first and second sheets forming parts of the plastic unit.

2. A method according to claim 1 in which step (j) further comprises the step of fusing the first and second sheets to the core.

* * * * *